(12) United States Patent
Itoh

(10) Patent No.: US 8,994,582 B2
(45) Date of Patent: Mar. 31, 2015

(54) CALCULATION DEVICE FOR RADAR APPARATUS, RADAR APPARATUS AND CALCULATION METHOD

(75) Inventor: Jun Itoh, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 486 days.

(21) Appl. No.: 13/425,981

(22) Filed: Mar. 21, 2012

(65) Prior Publication Data

US 2012/0242531 A1 Sep. 27, 2012

(30) Foreign Application Priority Data

Mar. 23, 2011 (JP) .................. 2011-064608

(51) Int. Cl.
*G01S 13/34* (2006.01)
*G01S 13/93* (2006.01)
*G01S 7/40* (2006.01)
(Continued)

(52) U.S. Cl.
CPC ............ *G01S 13/931* (2013.01); *G01S 7/4026* (2013.01); *G01S 13/345* (2013.01); *G01S 13/48* (2013.01); *G01S 13/584* (2013.01); *G01S 2007/4091* (2013.01); *G01S 2007/4034* (2013.01); *G01S 2007/403* (2013.01); *G01S 7/4056* (2013.01); *G01S 2013/9353* (2013.01)
USPC ............. 342/107; 342/108; 342/113; 342/70; 342/141; 342/146

(58) Field of Classification Search
CPC ... G01S 13/931; G01S 7/4056; G01S 13/584; G01S 13/345; G01S 7/4026; G01S 13/48; G01S 2013/9353; G01S 2007/4091; G01S 2007/403; G01S 2007/4034

USPC ................. 342/107–108, 113, 133, 139–141, 342/146–147
See application file for complete search history.

(56) References Cited

U.S. PATENT DOCUMENTS

| | | | | |
|---|---|---|---|---|
| 3,291,988 A * | 12/1966 | Chope et al. | ................... | 250/366 |
| 4,331,958 A * | 5/1982 | Lacomme | ..................... | 342/152 |
| 6,025,797 A | 2/2000 | Kawai et al. | | |
| 6,744,399 B2 * | 6/2004 | Tohyama et al. | ............. | 342/165 |
| 2003/0184471 A1 * | 10/2003 | Tohyama et al. | ............. | 342/175 |

(Continued)

FOREIGN PATENT DOCUMENTS

| | | | |
|---|---|---|---|
| DE | 102006019846 A1 * | 5/2007 | |
| DE | 19633704 B4 * | 5/2010 | |

(Continued)

OTHER PUBLICATIONS

Extended European Search Report issued in European Patent Application No. 12160868.1 dated Oct. 9, 2012.

(Continued)

*Primary Examiner* — John B Sotomayor
(74) *Attorney, Agent, or Firm* — Oliff PLC

(57) ABSTRACT

There is a calculation device for a radar apparatus which is configured to specify a direction of a target based on a reception signal of an antenna. A calculation unit is configured to calculate a relative displacement magnitude in a lateral direction of the target relative to a traveling direction of a moving object having the antenna mounted thereon, from data of the target position-measured by the reception signal while the moving object is moving, and evaluate a relative inclination between a reference axis of a scanning direction of the radar apparatus and a reference axis of the traveling direction of the moving object, based on the displacement magnitude.

7 Claims, 18 Drawing Sheets

(51) Int. Cl.
*G01S 13/48* (2006.01)
*G01S 13/58* (2006.01)

(56) References Cited

U.S. PATENT DOCUMENTS

2009/0096664 A1* 4/2009 Carroll et al. .................. 342/147
2012/0242531 A1* 9/2012 Itoh ............................... 342/107
2013/0093613 A1* 4/2013 Itoh et al. ........................ 342/70

FOREIGN PATENT DOCUMENTS

| | | | | |
|---|---|---|---|---|
| EP | 1429154 | B1 | * | 4/2006 |
| EP | 1770410 | A1 | * | 4/2007 |
| EP | 1770410 | A4 | * | 3/2010 |
| GB | 896374 | A | * | 5/1962 |
| JP | A-08-320371 | | | 12/1996 |
| JP | A-2001-066361 | | | 3/2001 |
| JP | A-2001-166051 | | | 6/2001 |
| JP | A-2002-228749 | | | 8/2002 |
| JP | 4265803 | B2 | * | 5/2009 |
| JP | A-2010-197215 | | | 9/2010 |

OTHER PUBLICATIONS

Aug. 19, 2014 Office Action issued in Japanese Patent Application No. 2011-064608 (with translation).

* cited by examiner

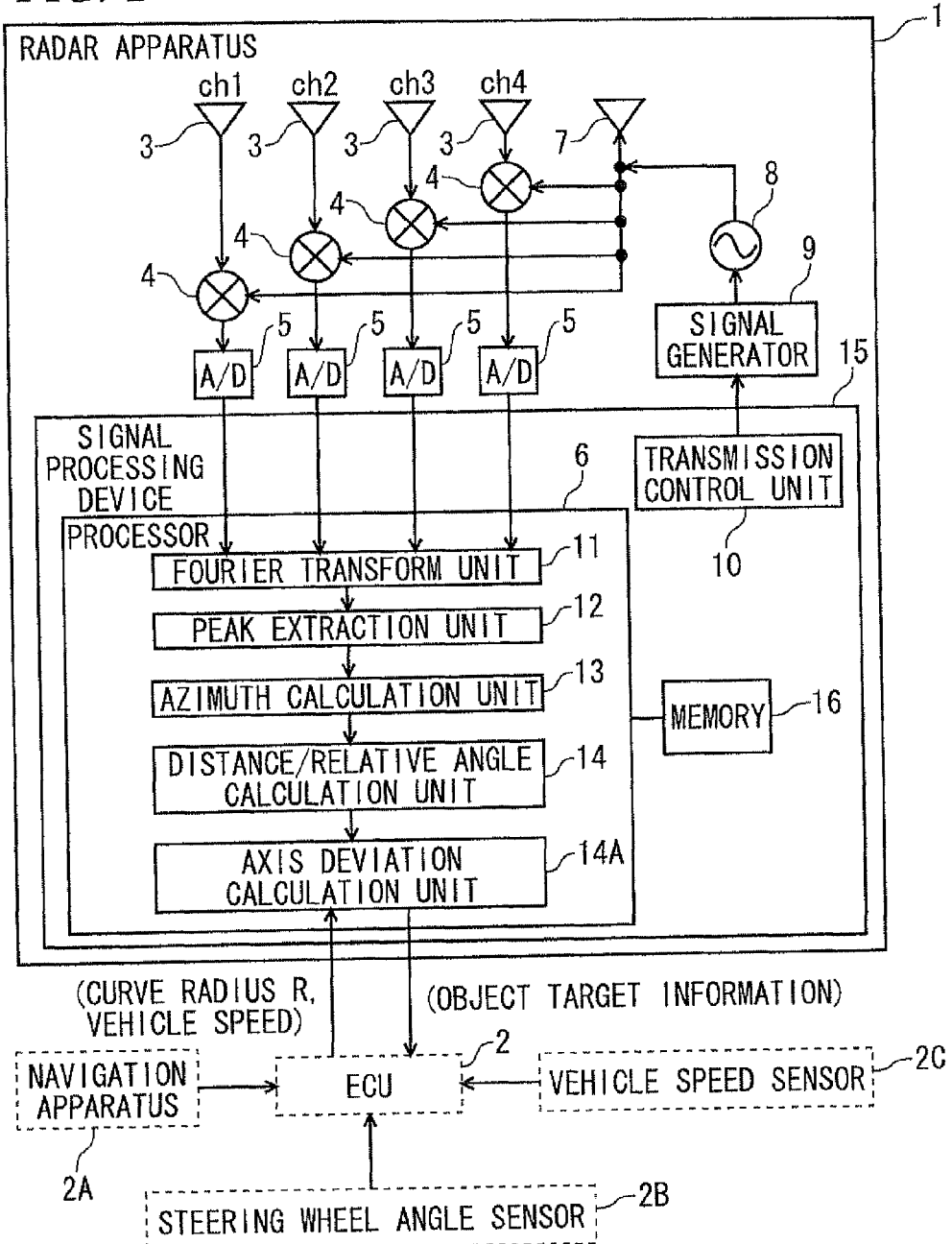

FREQUENCY SPECTRUM OF UP BEAT FREQUENCY COMPONENTS

FREQUENCY SPECTRUM OF DOWN BEAT FREQUENCY COMPONENTS

FIG. 8

DATA OF EACH TARGET

| TARGET | ANGLE | DISTANCE | SPEED |
|---|---|---|---|
| TG1 | D1 | R1 | V1 |
| TG2 | D2 | R2 | V2 |
| TG3 | D3 | R3 | V3 |
| TG4 | D4 | R4 | V4 |
| TG5 | D5 | R5 | V5 |

CALCULATION DEVICE FOR RADAR APPARATUS, RADAR APPARATUS AND CALCULATION METHOD

The disclosure of Japanese Patent Application No. 2011-064608 filed on Mar. 23, 2011, including specification, drawings and claims is incorporated herein by reference in its entirety.

BACKGROUND

The invention relates to a calculation device for a radar apparatus, a radar apparatus and calculation method and program for a radar apparatus.

When radar waves are received by an array antenna and reception signals of respective antennae are analyzed, an arrival direction of the radar waves can be estimated. Since a calculated angle is a relative angle of the array antenna and the arrival direction of the radar wave, when a mount angle of the array antenna is inclined, a false target angle is calculated. Accordingly, a variety of technologies of detecting axis deviation of a scanning angle of the array antenna have been suggested (for example, refer to Patent Documents 1 to 3).

Patent Document 1: JP-A-2001-166051
Patent Document 2: JP-A-8-320371
Patent Document 3: JP-A-2002-228749

Since the axis deviation determination is to correct an error between an estimated angle, which is obtained by analyzing the reception signal, and an actual angle, it is necessary to use data of a target to be estimated. Here, in the axis deviation determination of the related art, various conditions are required for the target that is used for the axis deviation determination, such as linear target, linearly traveling target or stationary target. Accordingly, when there is no target satisfying the conditions, it is not possible to determine the axis deviation.

SUMMARY

It is therefore an object of the present invention to provide a calculation device for a radar apparatus, a radar apparatus and calculation method and program for a radar apparatus, which are not bound to conditions of a target to be used in axis deviation determination.

In order to achieve the above object, according to an aspect of the embodiments of the present invention, an amount of lateral displacement of a target is estimated from data of the target that is position-measured by a reception signal during moving, so that axis deviation is evaluated.

In particular, there is provided a calculation device for a radar apparatus which is configured to specify a direction of a target based on a reception signal of an antenna, the calculation device comprising: a calculation unit configured to calculate a relative displacement magnitude in a lateral direction of the target relative to a traveling direction of a moving object having the antenna mounted thereon, from data of the target position-measured by the reception signal while the moving object is moving, and evaluate a relative inclination between a reference axis of a scanning direction of the radar apparatus and a reference axis of the traveling direction of the moving object, based on the displacement magnitude.

The calculation device detects the axis deviation, based on the amounts of lateral displacement of the entire targets, on the presumption that the target, which is specified by the radar apparatus, individually moves in a free direction and the amounts of lateral displacement of the entire targets approaches a value of zero without limit. Accordingly, it is possible to detect the axis deviation by using the data of all the targets, without imposing the various conditions on the target that is used to determine the axis deviation.

By calculating the moving speed of each target in the lateral direction, it is possible to specifically calculate the magnitude of the relative inclination, which is an amount of the axis deviation, between the reference axis of the scanning direction of the radar apparatus and the reference axis of the traveling direction of the moving object.

Thereby, the accuracy of the data of each target obtained based on each reception signal is increased.

In the meantime, the calculation unit confirms the average of the magnitudes of the inclination, which are calculated by multiple calculations, by the statistical processing, and corrects the data of the angle and distance of the target position-measured by the reception signal, based on the confirmed average of the magnitudes of the inclination. Thereby, the accuracy of the data of each target obtained based on each reception signal is further increased.

In the meantime, the invention may be implemented in forms of a method or program, a radar apparatus having the calculation unit or a recording medium having the program recorded therein.

According to another aspect of the embodiments of the present invention, there is provided a radar apparatus which is configured to specify a direction of a target, the radar apparatus comprising: a calculation unit configured to calculate a relative displacement magnitude in a lateral direction of each target relative to a traveling direction of a moving object having an antenna mounted thereon, from data of the target position-measured by a reception signal of the antenna while the moving object is moving, and evaluate a relative inclination between a reference axis of a scanning direction of the radar apparatus and a reference axis of the traveling direction of the moving object, based on the displacement magnitude.

According to the aspects of the embodiments of the present invention, the calculation device is not bound to conditions of the target that is used for the axis deviation determination.

BRIEF DESCRIPTION OF THE DRAWINGS

In the accompanying drawings:
FIG. 1 shows a configuration of a radar apparatus;
FIG. 8 shows an example of data that is sent to an ECU.

DETAILED DESCRIPTION OF THE EMBODIMENTS

Figure 2A:
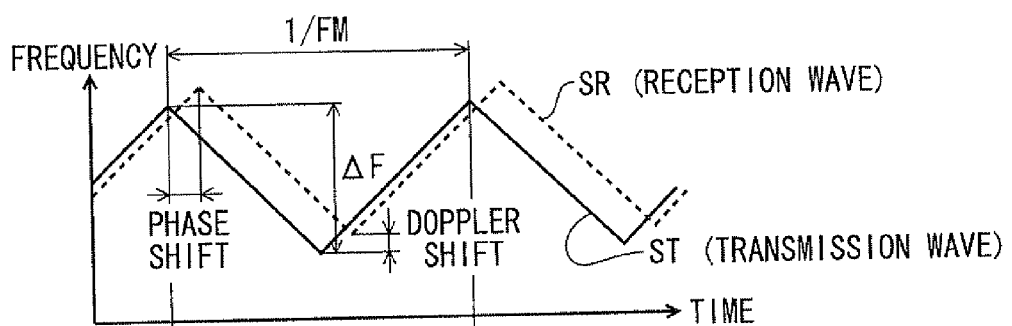
FIGS. 2A and 2B show waveforms of signals that are processed in the radar apparatus.

Hereinafter, illustrative embodiments of the invention will be described. The illustrative embodiments are just exemplary and the technical scope of the invention is not limited thereto.

FIG. 1 shows a configuration of a radar apparatus 1 according to an illustrative embodiment of the invention. The radar apparatus 1 is mounted on a vehicle and monitors surroundings of the vehicle by radar, thereby detecting a target such as other vehicles and obstacles. A detection result of the target is output to an ECU (Electrical Control Unit) 2 that controls the vehicle, and is thus used to control the vehicle, for example. The radar apparatus of this illustrative embodiment can be used for various utilities (for example, monitoring of an in-flight airplane, an underway ship and the like), in addition to the on-vehicle utility.

The radar apparatus 1 has receiving antennae 3 (ch1-4) that are arranged at an equal interval, mixers 4 (ch1-4) that are respectively connected to the respective receiving antennae 3, AD (Analog to Digital) converters 5 (ch1-4) that are respectively connected to the respective mixers 4 and a signal processing device 15 including a processor 6 that processes data of the respective AD converters 5. Also, the radar apparatus 1 has a transmission antenna 7, an oscillator 8, a signal generator 9 and a transmission control unit 10.

In the meantime, the radar apparatus 1 is provided with a dedicated receiving circuit for each of the receiving antennae, as described above. However, a receiving circuit that incorporates the reception signals of all the receiving antennae may be provided. In this case, although it is necessary for the receiving circuit to perform control of sequentially switching the corresponding receiving antennae in a time division manner, it is possible to make the circuit configuration of the radar apparatus 1 compact.

Also, the radar apparatus 1 is independently provided with the receiving antennae and the transmission antenna. However, the receiving antenna may combine the function of the transmission antenna. In this case, each antenna is switched into a receiving state just after transmitting a radar wave and then can receive a reflected wave of the radar wave transmitted from the corresponding antenna.

In the radar apparatus 1, when power is fed from the vehicle, the processor 6 executes computer program, thereby implementing function units of a Fourier calculation unit 11, a peak extraction unit 12, an azimuth calculation unit 13, a distance/relative speed calculation unit 14 and an axis deviation calculation unit 14A. These function units are implemented as the processor 6 executes the computer program in cooperation with a memory 16. However, for convenience of explanations, in FIG. 1, the respective function units are shown in the processor 6. In the meantime, the function units are not necessarily limited to the software implementation. For example, the function units may be entirely or partially implemented by a dedicated calculation circuit that is arranged inside or outside the processor 6.

Figure 2B:
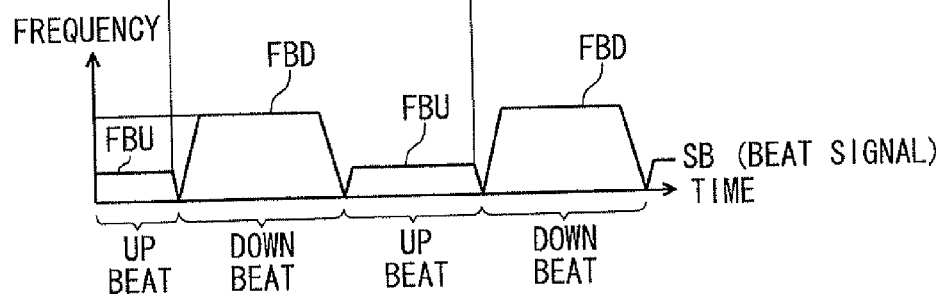

FIG. 2 shows waveforms of signals that are processed in the radar apparatus 1. The radar apparatus 1 adopts an FM-CW (Frequency Modulation-Continuous Wave) method. The signal generator 9 generates a transmission wave ST having a triangular waveform as shown in FIG. 2(a) and the oscillator 8 modulates and transmits the same. The mixer 4 (ch1-4) mixes a reception wave SR reflected from a target with the transmission wave ST, so that a beat signal SB as shown in FIG. 2(b) is obtained. In FIG. 2, a phase difference (phase shift) between the transmission wave ST and the reception wave SR is increased/decreased in proportional to a distance between the target and the radar apparatus and a frequency difference (Doppler shift) between the transmission wave ST and the reception wave SR is increased/decreased in proportional to relative speed between the target and the radar apparatus. A reference numeral FM in FIG. 2 is a frequency of the triangular wave that is generated by the signal generator 9. In the meantime, when there is a plurality of targets having different relative speeds or distances, a plurality of reflected waves having different phase shift amounts or Doppler shift amounts is received by the respective antennae and the beat signals SB obtained from the respective mixers 4 (ch1-4) include various components corresponding to the targets. However, FIG. 2 exemplifies the waveform when one target exists, for the purpose of easy understanding.

Figure 3:
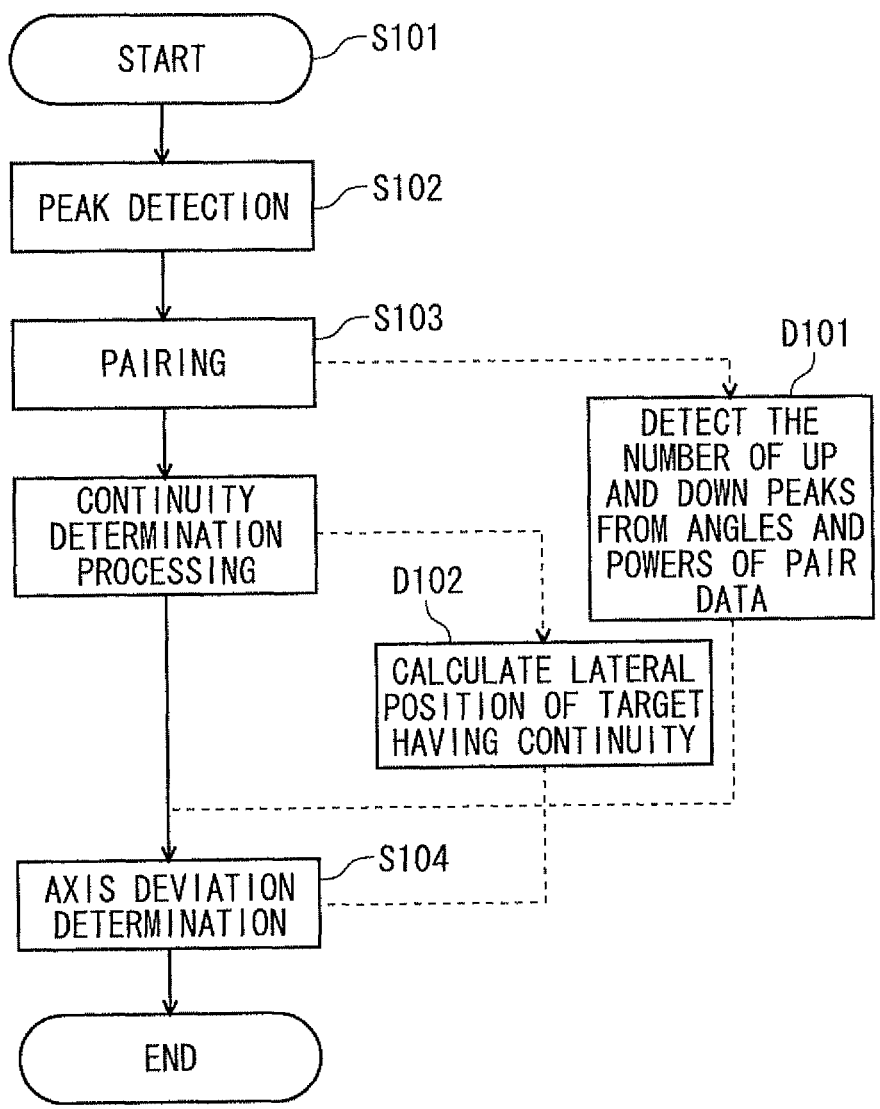
FIG. 3 is a flowchart showing main processing.

In the below, a processing flow that is executed by the processor 6 when the power is fed to the radar apparatus 1 from the vehicle is described with reference to a flowchart of FIG. 3. When a driving source of the vehicle operates, i.e., an engine starts (when the driving source is an internal combustion engine), or a system power supply turns on (when the driving source is a hybrid system or EV (Electric Car) system), the processor 6 repeats the processing flow described in the below.

Figure 4:
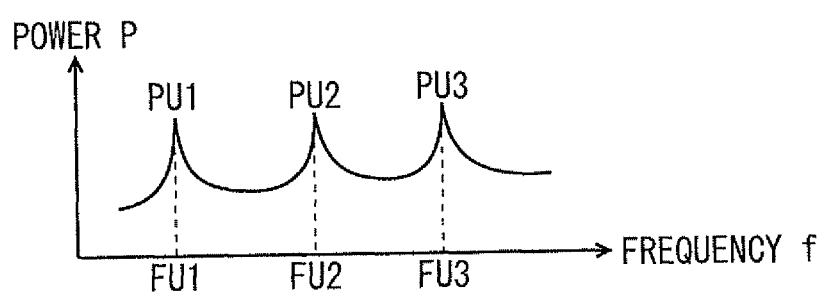
FIG. 4 is a frequency spectrum of up beat frequency components.
Figure 5:
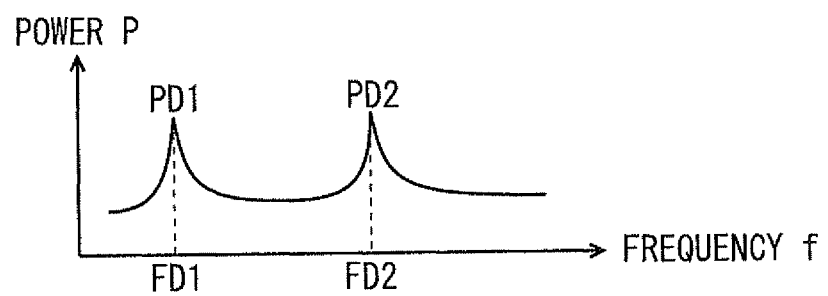
FIG. 5 is a frequency spectrum of down beat frequency components.

(step S101) The processor 6 performs a Fourier transform for each of up beat frequency components FBU and down beat frequency components FBD of the beat signal SB for each channel (ch1-4), thereby obtaining a frequency spectrum of the up beat frequency components FBU as shown in FIG. 4 and a frequency spectrum of the down beat frequency components FBD as shown in FIG. 5.

Since the respective receiving antennae 3 (ch1-4) receive the reflected waves from the same target, the frequency spectra of the same shape having the same peak frequencies are obtained from the respective receiving antennae 3 (ch1-4) in the Fourier transform. However, since phases are different in the respective receiving antennae 3 (ch1-4), the phases are different for each antenna even though the peak frequencies are the same. For example, a peak PU1 (ch1) of the frequency spectrum of the receiving antenna 3 (ch1) and a peak PU1 (ch2) of the frequency spectrum of the receiving antenna 3 (ch2) are the same with respect to the frequency but are different with respect to the phase.

The processor 6 extracts peaks having predetermined power or higher from the respective frequency spectra of the up beat frequency components FBU and the down beat frequency components FBD obtained by the Fourier transform, and extracts frequencies, powers and phases of the extracted peaks.

Figure 6:
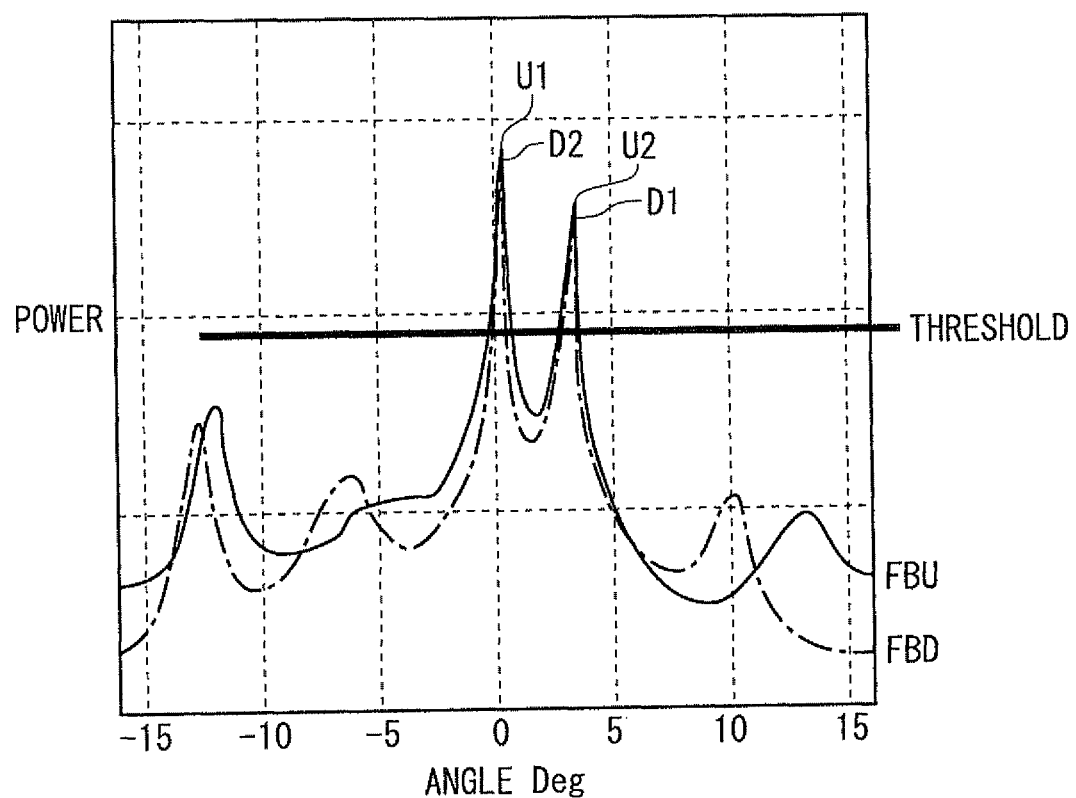
FIG. 6 is an angle spectrum.

Since the peaks of the frequency spectrum may include information of a plurality of targets, it is necessary to separate a target from one peak and to estimate an angle of the separated target. Accordingly, the processor 6 calculates angle spectra as shown in FIG. 6 by using various angle estimation methods such as ESPRIT and MUSIC for each of the up beat frequency component FBU and down beat frequency component FBD, based on the peaks having the same frequency in all the receiving antennae 3 (ch1-4) (for example, for the up beat frequency component FBU, the peak PU1 (ch1), the peak PU1 (ch2), the peak PU1 (ch3) and the peak PU1 (ch4) are peaks having the same frequency FU1, and for the down beat frequency component FBU, the peak PD1 (ch1), the peak PD1 (ch2), the peak PD1 (ch3) and the peak PD1 (ch4) are peaks having the same frequency FD1).

Figure 7:
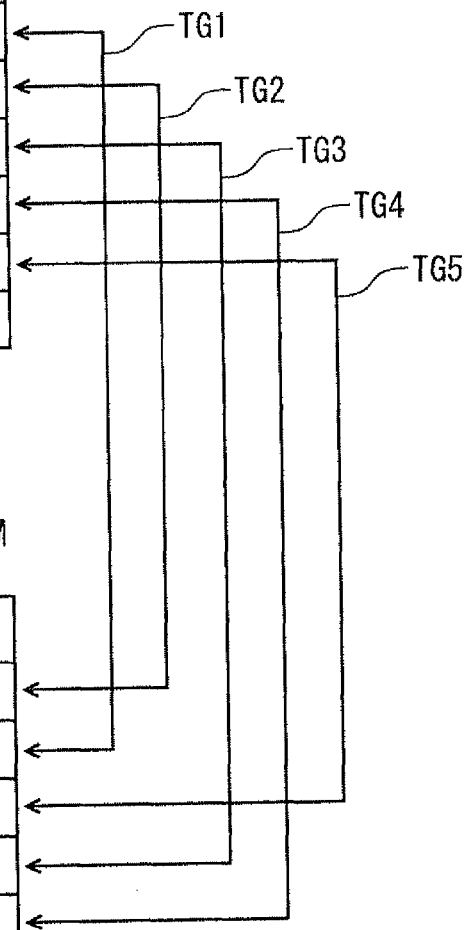
FIG. 7 shows an example of angles and powers of respective peaks.

The processor 6 calculates an angle spectrum by a predetermined angle estimation method, for each of peak frequencies of the frequency spectrum. For example, regarding the frequency spectra shown in FIGS. 4 and 5, the processor 6 calculates an angle spectrum for each of the five peak frequencies (FU1-3, FD1-2). FIG. 6 is an example of the angle spectrum of the peak frequency FU1, in which the up beat frequency component FBU and the down beat frequency component FBD are shown together. Then, the processor extracts angles and powers of the peaks of the angle spectrum, for each of the angle spectra of the five peak frequencies (FU1-3, FD1-2). FIG. 7 shows an example of the angles and powers of the respective peaks of the respective angle spectra of the five peak frequencies (FU1-3, FD1-2).

(step S102) When the processor 6 extracts the angles and powers of the respective peaks of the respective angle spectra, the processor pairs the respective peaks, thereby specifying a target that actually exists. That is, the processor pairs the respective peaks of the angle spectrum of the up beat frequency component FBU and the respective peaks of the angle spectrum of the down beat frequency component FBU, which peaks are similar to each other with respect to the angles or powers. For example, in the angle spectrum shown in FIG. 6, the angles and powers of the peak U1 and peak U2 of the up beat frequency component FBU of the peak frequency FU1 are approximate to the angles and powers of the peak D1 and peak D2 of the down beat frequency component FBD. For example, the peak U1 and the peak D2 are similar to each other, in that the angles thereof are about 0°, and the peak U2 and the peak D1 are similar to each other, in that the angles thereof are about 3°. Accordingly, since the angle θU1 and power PWU1 of the peak U1 and the angle θD2 and power PWD2 of the peak D2, which are shown in FIG. 7, are similar to each other and the peak U1 and the peak D2 are paired, it is specified that the peak U1 and the peak D2 indicate the target TG1.

The processor 6 pairs the respective peaks (peaks U1-6) of the angle spectrum of the up beat frequency component FBU and the respective peaks (peaks D1-5) of the angle spectrum of the down beat frequency component FBD, thereby specifying five targets TG1-5, as shown in FIG. 7. In the meantime, the peak U6 of the angle spectrum of the up beat frequency component FBU is not paired with any peak of the angle spectrum of the down beat frequency component FBD. Therefore, it can be seen that the peak U6 is a peak that is caused due to internal noises and the like and is not caused from a target that actually exists.

The processor 6 calculates angles, distances and relative speeds of the respective targets, based on the paired peak frequencies. Here, when propagation speed of the radar wave is C, a modulation frequency of the triangular wave generated from the signal generator 9 is FM, a central frequency of the triangular wave is F0 and a modulation width of the triangular wave is ΔF, a distance R (R1 to R5) and relative speed V (V1 to V5) of each target is deduced by following equations.

$$R=((FU+FD) \cdot C)/(8 \cdot \Delta F \cdot FM)$$

$$V=((FD+FD) \cdot C)/(4 \cdot F0)$$

Also, although the angles of the peaks of the up beat frequency component FBU and down beat frequency component FBD, which are paired, are not the substantially same, an angle D (D1 to D5) of each target is deduced by a following equation so as to increase the accuracy.

$$D=(\theta U+\theta D)/2$$

Meanwhile, in this step, the processor 6 detects a sum of the number of the peaks of the up beat frequency component FBU and down beat frequency component FBD, which are paired. A value of the detected sum is used in axis deviation determination processing (step S104) that will be described later. The number of peaks of the angle spectrum is the number of peaks that exceeds a threshold in a predetermined angle (°) in FIG. 6. The predetermined angle is 3°, for example. When the predetermined angle is 3°, the sum of the number of the peaks of the angle spectrum in FIG. 6 is 2 (two).

(step S103) The processor 6 stores positions of the target in the memory 16, which are continuously detected by the repeating scan. Whenever the scan is performed, the processor compares position data of the target of previous time and position data of the target of this time and thus determines whether or not continuity from an amount of displacement of the target. When the amount of displacement is within a prescribed range, the processor 6 determines that there is continuity, and when the amount of displacement is beyond the prescribed range, the processor determines that there is no continuity. Then, the radar apparatus 10 outputs the data of the angle, distance and relative speed of the target, for which it has been determined that there is continuity, to the ECU 2. For example, when the five targets are specified from the respective peaks of the angle spectrum, as shown in FIG. 7, the data as shown in FIG. 8 is sent from the processor 6 to the ECU 2. The angles, distances and relative speeds of the respective targets are used in the ECU for vehicle control and the like.

In the meantime, the processor 6 may perform a scan in which a target is lost because a reception signal having sufficient strength cannot be obtained due to any reason. In this case, the processor 6 performs an extrapolation of estimating a position of the lost target with respect to the scan in which a target is lost. Thereby, when a position of the target is again detected, the processor keeps the continuity of the estimated position and a newly detected position.

In this step, the processor 6 calculates a lateral position of the target having the continuity, which is used in the axis deviation determination processing (step S104) (which will be described later). That is, the processor 6 calculates a lateral position for axis deviation detection of the target for which it has been determined that there is continuity, based on the data of the angle and distance of the target. The lateral position for axis deviation detection is deduced from a following equation.

lateral position for axis deviation detection=distance*sin(angle)

Figure 9:
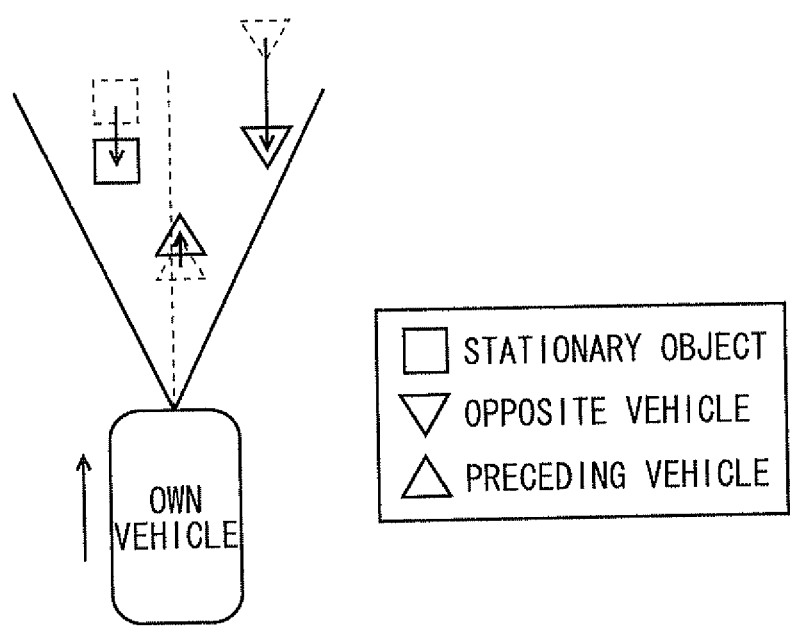
FIG. 9 shows moving of a target when there is no axis deviation.
Figure 10:
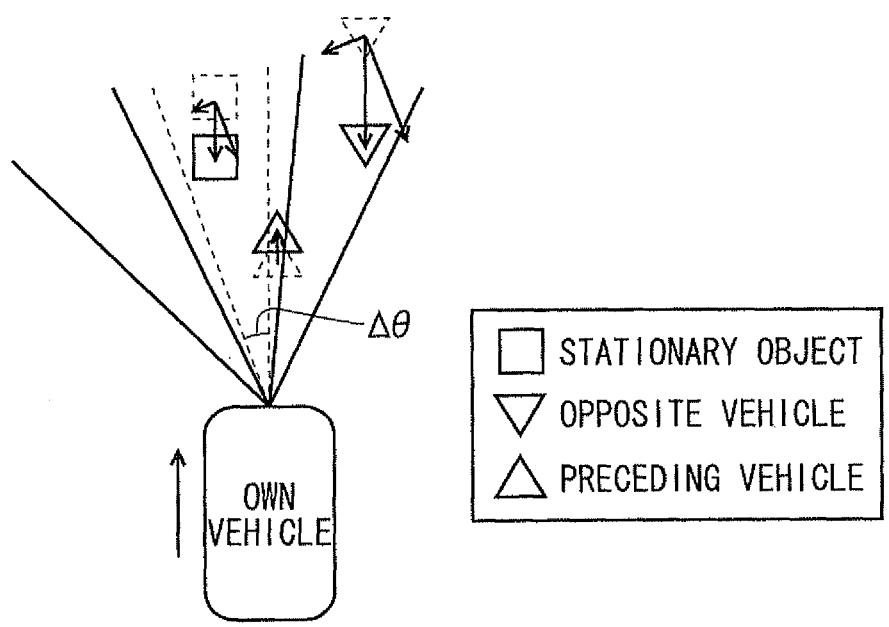
FIG. 10 shows moving of a target when there is axis deviation.

(step S104) After performing the continuity determination processing, the processor 6 executes following axis deviation determination processing. The following processing is to evaluate axis deviation, which is caused due to a change in the attachment angle of the radar apparatus 1 and the like, and to thus correct the same. When there is no axis deviation and a central direction of the scanning angle of the radar apparatus 1 coincides with a straight traveling direction of the vehicle having the radar apparatus 1 mounted thereon, each target does not move in the lateral direction, as it appears, as shown in FIG. 9. However, when there is axis deviation and a central direction of the scanning angle of the radar apparatus 1 does not coincide with a straight traveling direction of the vehicle having the radar apparatus 1 mounted thereon, each target moves in the lateral direction, as it appears, as shown in FIG. 10.

Figure 11:
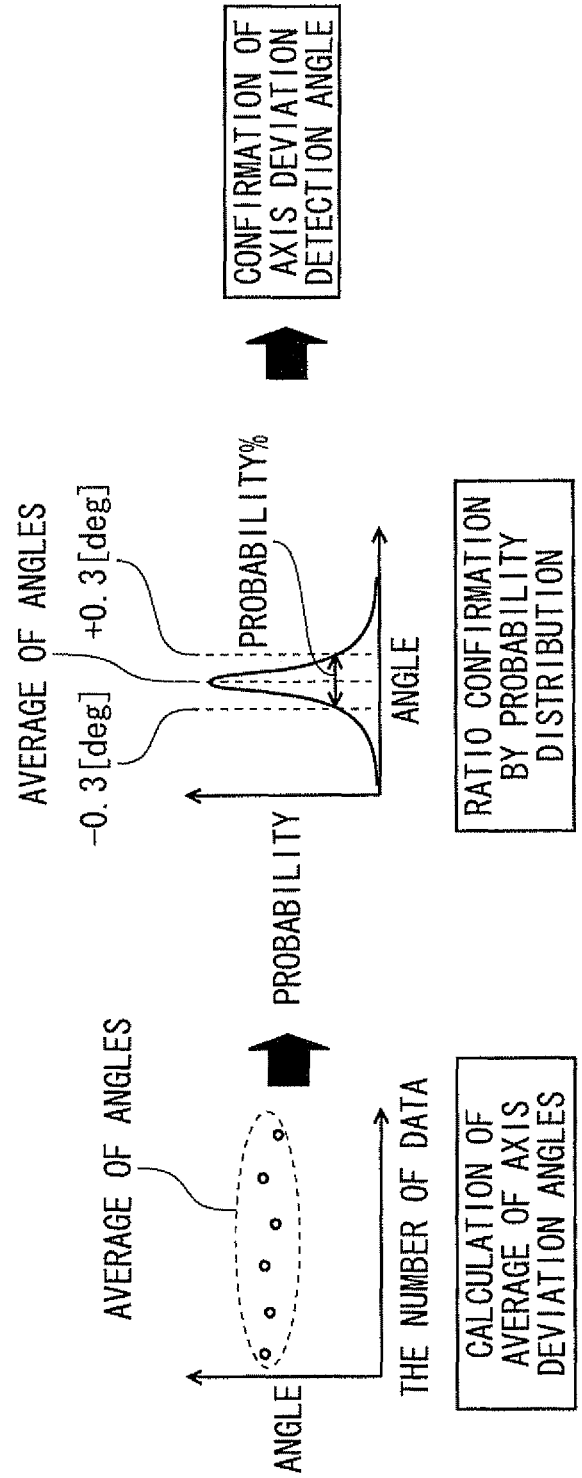
FIG. 11 shows a processing outline of axis deviation determination.

Therefore, when performing the correction of the axis deviation, if there is no axis deviation, the processor 6 detects axis deviation, based on an average magnitude of lateral speeds of all the targets, on the presumption that each target individually moves in a free direction and an average of lateral speeds of all the targets approaches a value of zero without limit. Meanwhile, in the axis deviation determination processing that is described in the below, when the average magnitude of the lateral speeds is immediately used in the axis deviation determination processing, the data that is output by the radar apparatus 10 becomes unstable. Accordingly, as shown in FIG. 11, an average of the axis deviation angles is calculated, a ratio thereof is checked by a probability distribution and then an axis deviation detection angle is confirmed. In the ratio check by the probability distribution, in order to satisfy an allowable error within ±3° that is the specification of the radar apparatus 1, a ratio of angles belonging to the range is statistically confirmed.

Figure 12:
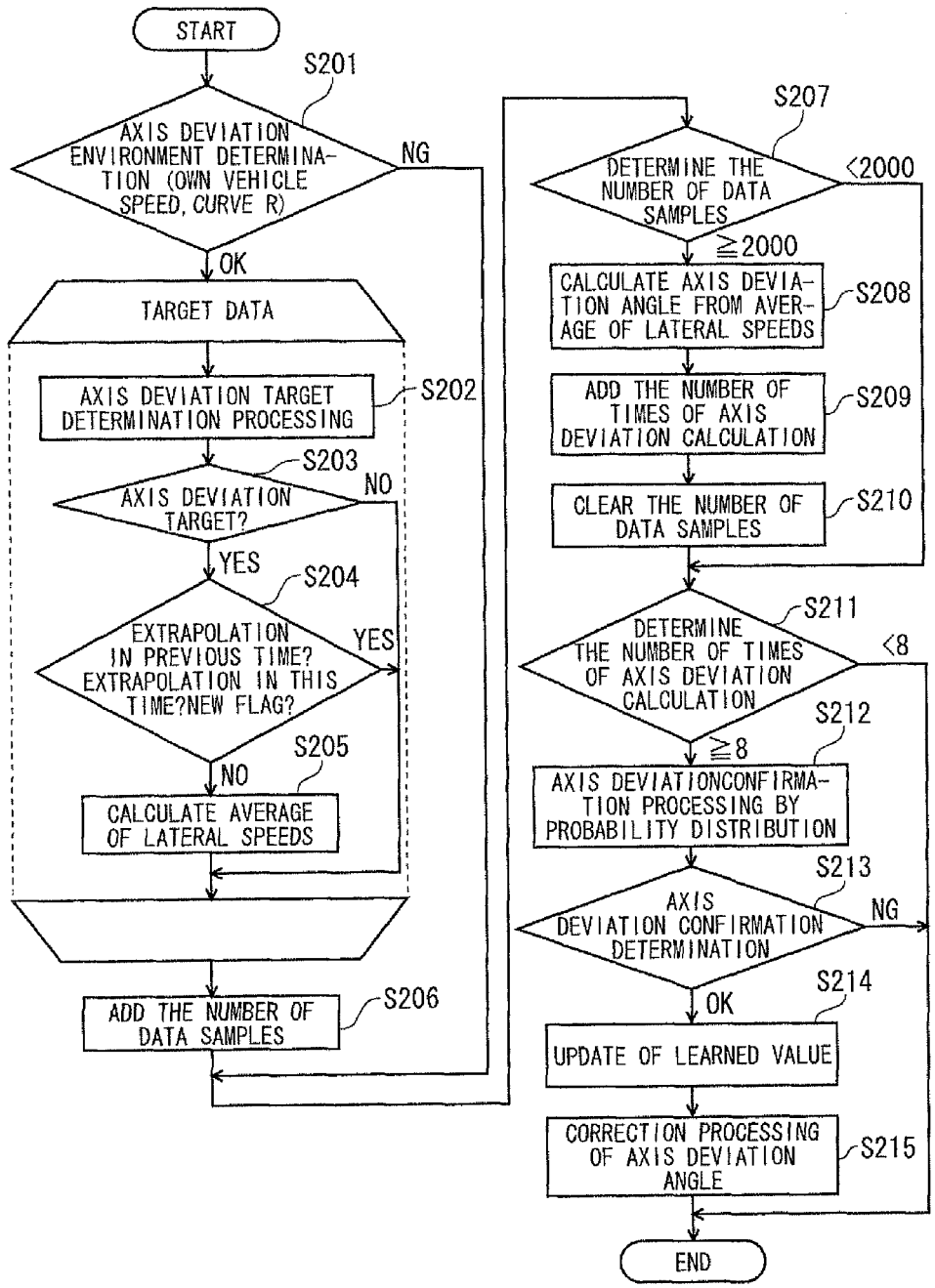
FIG. 12 is a flowchart showing processing of axis deviation determination.

The processing flow that is described in the below is based on the above concept and is executed by the processor 6 after the continuity determination processing (step S103). In the below, a detailed processing flow of the axis deviation determination processing (step S104) is described with reference to a flowchart shown in FIG. 12.

(step S201) The processor 6 determines whether an environment is appropriate for accumulation of the data that is provided for the axis deviation determination. For example, the data, which is acquired when the speed of the own vehicle is slow, is not effective data that can be used to determine the axis deviation determination, because a magnitude of the lateral speed of each target, which is obtained by the analysis on the reflected wave, is too small even though there is axis deviation. Also, for example, the data, which is obtained when the own vehicle rounds a curve, is not effective data because the lateral speed appears in each target by the analysis on the reflected wave even though there is no axis deviation. Accordingly, the processor 6 determines whether a magnitude of the speed of the own vehicle or a curve, which is transmitted from a steering wheel angle sensor 2B, a vehicle speed sensor 2C or navigation apparatus 2A through the ECU 2, satisfies a predetermined condition. Here, for example, when the speed of the own vehicle is 40 km/hour or higher and a magnitude of a curve radius R is 3000 m or larger, the processor 6 determines in the affirmative and determines in the negative for the other cases. In case of the affirmative determination, the processor 6 executes processing of steps S202 to S205 and calculates an average of the lateral speeds.

(step S202) The processor 6 determines whether the target is appropriate for the axis deviation determination, from the data of each target obtained by the processing of step S103. For example, if data of a target having slow ground speed is used to determine the axis deviation, since a magnitude of the lateral speed of the target obtained by the analysis on the reflected wave is too small, the corresponding data is not effective data that can be used to determine the axis deviation. Also, in the step S202, the data of the target having the sum (=3 or larger) of the peaks of the angle spectrum obtained in the step S201 is considered that the accuracy of the angle thereof to be estimated is low. That is, when the sum is 3 or larger, it is thought that there is a high possibility that the peaks appear beyond the number of actual peaks due to the noise and the like. Therefore, the data of such target is also not efficient data that can be used to determine the axis deviation. Hence, the processor 6 determines whether an absolute value of the ground speed of the target is 30 km/hour or higher from the data of target obtained by the processing of step S103. Also, the processor 6 determines whether the conditions of the target such as power or number of peaks of the angle spectrum satisfy prescribed values, thereby determining whether the target is appropriate for the axis deviation determination.

(step S203) For the target having satisfied the prescribed conditions in the determination processing of step S202, the processor 6 executes processing of steps S204 and S205. Also, for the target having not satisfied the prescribed conditions, the processor omits the processing of steps S204 and S205.

(step S204) The processor 6 determines whether the target having satisfied the prescribed conditions in the determination processing of step S202 determines a prescribed condition. That is, even though the target satisfies the conditions of step S202, if the a part of the data acquired with a period of 50 milliseconds has a deficit and thus data of the deficient part is interpolated, the corresponding data has a low credibility as the data that can be used to determine the axis deviation. Therefore, the processor 6 determines whether or not a flag (extrapolation flag), which indicates whether the acquired data of the target is interpolated, or whether or not a flag (new flag), which indicates whether the target newly appears. As described below, the lateral speed is calculated, based on a difference between a lateral position (this time) for axis deviation based on the data acquired at a specific timing and a lateral position (previous time) for axis deviation based on the data acquired at a previous timing and elapsed time therebetween. Therefore, when there is an extrapolation flag or new flag in this time or previous time, it can be seen that the corresponding data is not appropriate for the calculation of the lateral speed.

Figure 13:
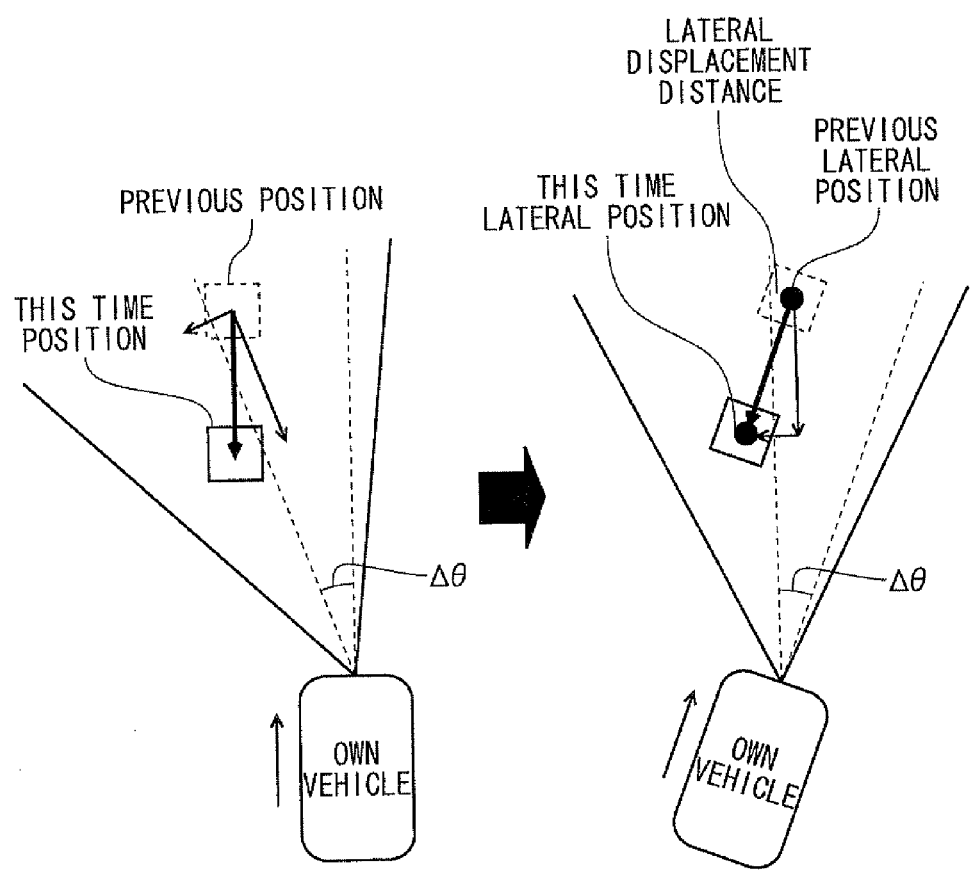
FIG. 13 is an outline view of a method of calculating lateral speed.

(step S205) When a result of the determination in step S204 is affirmative, the processor 6 calculates an average of the lateral speeds. The average of the lateral speeds is calculated as follows. First, the processor 6 calculates the lateral speeds of the respective targets. As shown in FIG. 13, since the lateral speed is a moving speed of a lateral position, it is calculated by a following equation.

lateral speed=(lateral position (this time) for axis deviation−lateral position (previous time) for axis deviation)/elapsed time ($\Delta$T(sec)/absolute value of relative speed (m/sec)

In the meantime, as shown in the above equation, the lateral speed is calculated by dividing by the absolute value of the relative speed. This is to convert the lateral speed, which is calculated by dividing by the relative speed, into the absolute speed of the target from the relative speed of the target and the own vehicle, thereby suppressing the non-uniformity of the lateral speed. Therefore, when the absolute value of the relative speed is zero, the lateral speed is not calculated.

Figure 14:
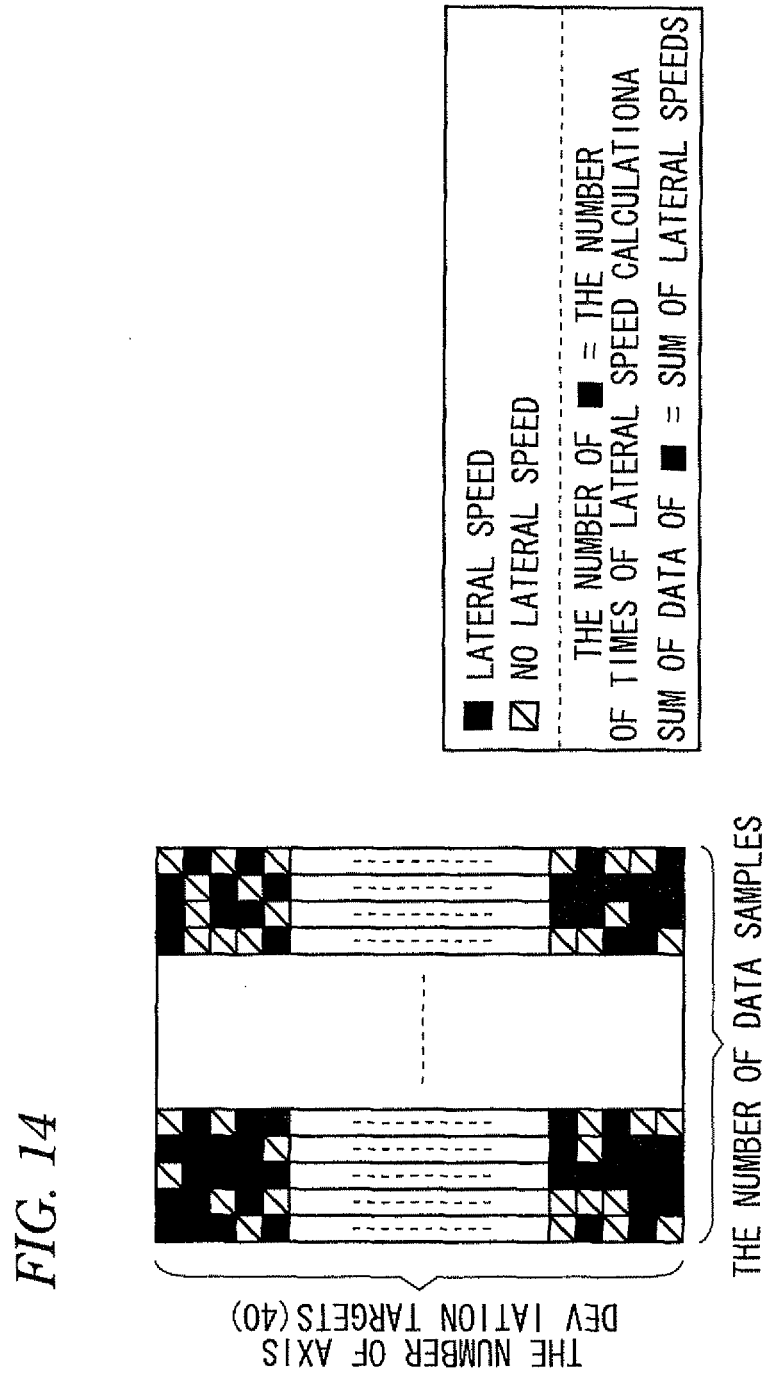
FIG. 14 is an example of data of lateral speed to be accumulated.

When the lateral speeds of the respective targets are calculated, the processor 6 accumulates the same in the memory 16. In the meantime, the processor 6 accumulates the respective lateral speeds of a plurality of (for example, 40) targets in the memory 16, as shown in FIG. 14. In FIG. 14, there are many parts that the lateral speed is not calculated. However, the parts are parts that the lateral speed is not calculated because the result of the determination processing of step S204 is negative, for example.

Then, when the lateral speeds of the respective targets are calculated, the processor 6 calculates an entire average of the lateral speeds, from the number of times of calculations of the lateral speed and the sum of the lateral speeds. The average of the lateral speeds is calculated by a following equation.

average of lateral speeds (m/s)=the sum of the lateral speeds/the number of times of calculations of the lateral speed (step S206) When the processing from step S201 to step S205 is executed, the processor 6 adds 1 (one) to a counter of the number of data samples.

(step S207) The processor 6 determines whether the number of data samples necessary for the axis deviation determination is made. The number of data samples is 2,000, for example. When the counter of the number of data samples is 2000 or larger, the processor 6 executes processing after step S208. Also, when the counter of the number of data samples is below 2000, the processor 6 executes processing after step S211. In the meantime, since the data sample is acquired with the period of 50 milliseconds, it takes for the counter of the number of data samples at least 100 seconds to reach 2,000.

(step S208) The processor 6 calculates an axis deviation angle from the average of the lateral speeds. The axis deviation angle is calculated as follows. First, the processor 6 calculates an entire average of the lateral speeds. The average of lateral speeds is calculated by a following equation. A sum of the averages of lateral speeds is a sum of the sampling data for a predetermined number of times (for example, 3 times) and is calculated based on the latest data of the predetermined number of times while sequentially deleting the old data of the predetermined number of times or larger.

entire average of lateral speeds=sum of averages of lateral speeds/the accumulated number of data of the average of lateral speeds Then, the processor 6 calculates an axis deviation angle by a following equation, from the entire average of lateral speeds axis deviation angle (°)=ASIN (entire average of lateral speeds*180/π)

(step S209) When the axis deviation angle is calculated, the processor 6 adds 1 (one) to a counter of the number of times of the axis deviation calculation.

(step S210) When 1 (one) is added to the counter of the number of times of the axis deviation calculation, the processor 6 clears the counter of the number of data samples.

(step S211) The processor 6 determines whether the number of times of the axis deviation calculation satisfies a predetermined condition. When the number of times of the axis deviation calculation is 8 (eight) or larger, the processor 6 determines that the number of samples of axis deviation angles enough to confirm an axis deviation angle by statistical processing using a probability distribution is obtained, and executes processing after step S212. On the other hand, when the number of times of the axis deviation calculation is below 8 (eight), the processor 6 completes the series of processing and repeats the processing after step S201.

Figure 15:
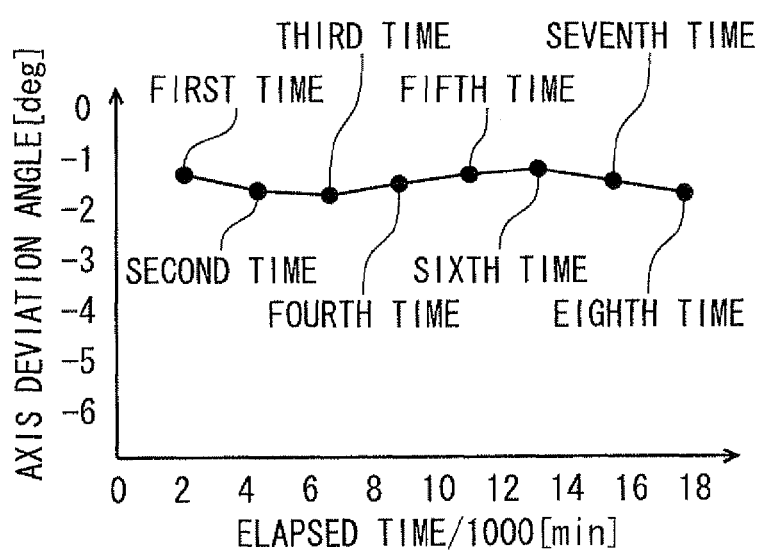
FIG. 15 is a graph in which axis deviation angles are plotted.

(step S212) When the number of times of the axis deviation calculation is 8 (eight) or larger, the processor 6 executes axis deviation confirmation processing by the probability distribution. That is, as shown in FIG. 15, when 8 (eight) axis deviation angles are calculated, the processor 6 executes following confirmation processing. In the meantime, the axis deviation angle is calculated from the data of the average of lateral speeds of the predetermined number of times in the processing of step S208. Therefore, for the third data, the axis deviation angle is calculated from the average of lateral speeds from first time to third time.

Figure 16:
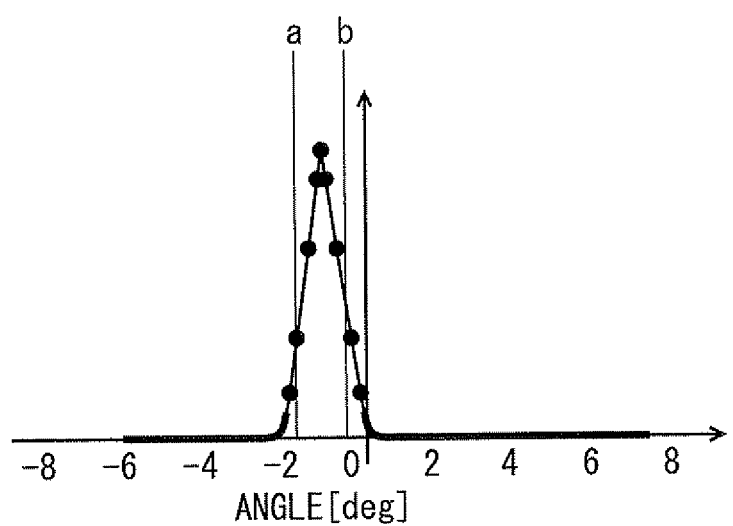
FIG. 16 is a graph showing a normal distribution of axis deviation angles.

The processor 6 calculates an average of the axis deviation angles by a following equation.

average of axis deviation angles=sum of axis deviation angles/the accumulated number of data of axis deviation calculations Then, as shown in FIG. 16, the processor obtains a probability within a range of ±3° of the average of axis deviation angles by a cumulative distribution function P(x). When an average of a normal distribution is μ and a standard deviation is σ, the cumulative distribution function is expressed by following equations.

$$P(x) = \frac{1}{2}\left(1 + \text{erf}\frac{|x-\mu|}{\sigma\sqrt{2}}\right)(x \geq \mu)$$ [equation 1]

$$P(x) = 1 - \left(\frac{1}{2}\left(1 + \text{erf}\frac{|x-\mu|}{\sigma\sqrt{2}}\right)\right)(x < \mu)$$

$$\text{error function erf}(x) = \frac{2}{\sqrt{\pi}}\int_0^x e^{-t^2}\,dt$$

For example, when the average of axis deviation angles is −1.5°, a probability between a −0.3° side (a) of the average and a +0.3° side (b) is obtained by a following equation.

probability (%)=(P(b)−P(a))*100 (b≥a)

Here, the probability is a probability that the calculated axis deviation angle belongs to ±3° of the average of axis deviation angles of the just previous eighth time (including the number of times of the axis deviation calculation). For example, the probability of 80% means that seven or eight times of the eight times of axis deviation angle calculation belong to ±3° of the average of axis deviation angles.

Figure 17:
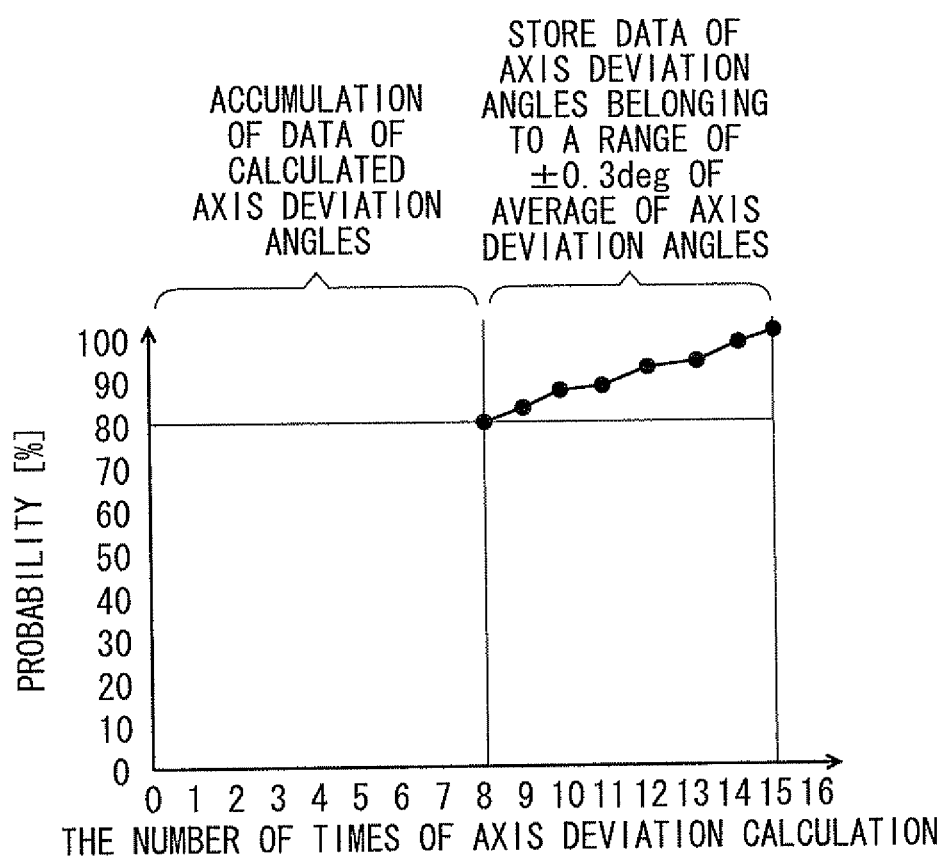
FIG. 17 is a first graph in which axis deviation angles after eighth time are plotted.

When the calculated probability is 80% or larger, it can be said that there is a high possibility that the angle deviation occurs within a range from a to b. Accordingly, in a next cycle (i.e., calculations of axis deviation angle after nine time), the processor accumulates only data that the axis deviation angle belongs to the range of ±3° of the average of axis deviation angles at the time when the probability is 80% or larger. Then, as shown in FIG. 17, at the time at which the probability becomes 100%, the processor confirms the average of axis deviation angles of the just previous eighth time including the corresponding point of time. In the meantime, the number of data to be accumulated is eight, and when accumulating the data after nine, the processor sequentially deletes the old data.

Figure 18:
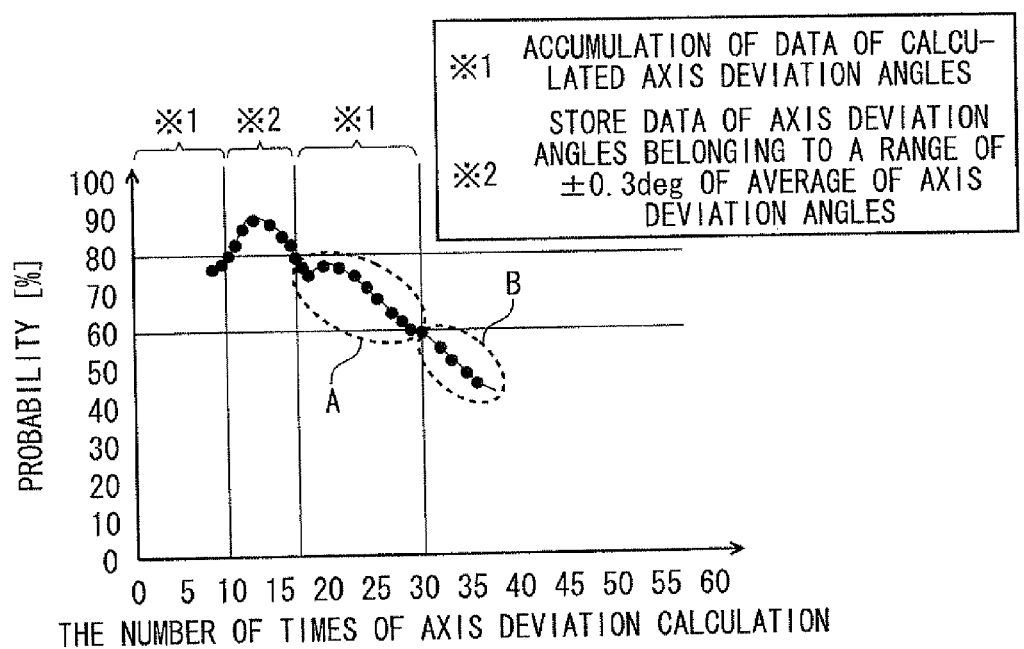
FIG. 18 is a second graph in which axis deviation angles after eighth time are plotted.

Also, after the calculated probability becomes 80% or larger, the processor accumulates only the data that the axis deviation angle belongs to the range of ±3° of the average. However, the data belonging to the range of ±3° of the average of the axis deviation angles may not be calculated thereafter and the calculated probability may be below 80%, as shown with a reference numeral A in FIG. 18. In this case, the processor stops accumulating the data of the axis deviation angle belonging to the range of ±3° of the average of the axis deviation angles and accumulates the calculated axis deviation angle. Also, when the calculated probability is further reduced under 80% and is below 60% as shown with a reference numeral B in FIG. 18, the processor clears all the data of the accumulated axis deviation angles. Also, when the axis deviation angle is not confirmed even though the number of axis deviation calculations exceeds 50 times, the processor clears all the data of the accumulated axis deviation angles. Then, the processor omits the processing of steps 214 and 215 and re-executes the processing after step S201.

(step S214) The processor 6 sets, as the axis deviation detection angle, the average of the axis deviation angles confirmed in the processing of step S213. The processor records, as a learned value, the axis deviation detection angle in the memory 16. Also, the processor clears the number of times of axis deviation calculations and the data of axis deviation angles.

(step S215) The processor 6 updates a correction angle for correcting the angle data to be output to the ECU 2, based on the axis deviation detection angle that has been recorded as a leaned value in step S214. The processor updates the correction angle by filtering the confirmed axis deviation detection angle by a following equation while investing time little by little.

new axis deviation angle (°)=(1−0.98)*axis deviation detection angle calculated in this time+0.98*new axis deviation angle of previous time Meanwhile, in order to prevent the correction angle from being frequently updated due to some changes, regarding the updating of the correction angle, he processor updates the data when an absolute value of the new axis deviation angle is 0.5° or larger. The calculated new axis deviation angle is stored in a non-volatile storage area of the memory 16 and is then used to determine whether the axis deviation occurs.

In the radar apparatus 1 of this illustrative embodiment, the processor 6 executes the series of axis deviation determination processing (step S104) shown in the processing flow (S201 to S215), thereby correcting the axis deviation. Thereby, the ostensible lateral moving of each target is solved.

Also, in the radar apparatus 1, there is no limit to the target that the processor 6 uses for the axis deviation determination, and the processor can detect the axis deviation by using the data of all targets. Therefore, it is possible to frequently determine the axis deviation, and when the axis deviation occurs, it is possible to immediately detect the axis deviation and to take countermeasures such as the updating of the correction angle, the repair of the apparatus, the warning to a driver and the like. That is, according to the related art, when determining the axis deviation, there are various limits to the targets, which are sampling objects, such as target data of a linear stationary matter, a vehicle traveling toward a predetermined direction and the like. However, in the radar apparatus 1, it is possible to determine the axis deviation by using the data of all targets.

In the meantime, according to the radar apparatus 1, in order to prevent the updating of the inappropriate correction angle, the processor 6 performs the variety of statistical processing, thereby finally confirming the correction angle. However, it may be possible to appropriately change the series of processing that is executed by the processor 6 without departing from the spirit of detecting the axis deviation, based on the average magnitude of the lateral speeds of the entire targets. For example, when the various statistical processing is not performed in updating the correction angle, the value of the calculated axis deviation angle may be immediately used as the update value of the correction angle.

Also, according to the radar apparatus 1, the various conditions are imposed on the target or own vehicle speed that the processor 6 uses for the axis deviation determination. However, the conditions may be omitted when the estimated direction or distance of the target, which is obtained by the angle spectrum, is highly accurate. Also, the radar apparatus 1 executes the series of processing, based on the reception signals of the antennae. However, it may be possible to perform the processing while mechanically moving a unified antenna.

What is claimed is:

1. A calculation device for a radar apparatus that is configured to specify a direction of a target based on a reception signal of an antenna mounted on a moving object, the calculation device comprising:
   a calculation to processor configured to:
      calculate a relative displacement magnitude from a lateral direction of the target relative to a traveling direction of the moving object using data representing the position of the target that is measured by the reception signal while the moving object is moving;
      calculate an average of relative moving speeds in the lateral direction of a plurality of targets relative to the traveling direction of the moving object; and
      evaluate a relative deviation between a reference axis of a scanning direction of the radar apparatus and a reference axis of the traveling direction of the moving, object based on the displacement magnitude.

2. The calculation device according to claim 1, wherein the calculation processor is further configured to (i) calculate the average of the relative moving speeds in the lateral direction of the plurality of targets relative to the traveling direction of the moving object and (ii) calculate a magnitude of the relative deviation between the reference axis of the scanning direction of the radar apparatus and the reference axis of the traveling direction of the moving object when an accumulation number of data of an angle and a distance of the plurality of targets, which is position-measured by the reception signal while the moving object is moving, reaches a predetermined number.

3. The calculation device according to claim 2, wherein the calculation processor is further configured to correct the data of the angle and distance of the target position-measured by the reception signal based on the calculated magnitude of the relative deviation.

4. The calculation device according to claim 2, wherein the calculation processor is further configured to (i) confirm an average magnitude of a plurality of relative deviations, which are calculated by multiple calculations that include statistical processing, and (ii) correct the data of the angle and distance of the target position-measured by the reception signal based on the confirmed average magnitude of the plurality of relative deviations.

5. A radar apparatus that is configured to specify a direction of one or more targets, the radar apparatus comprising:
   a calculation to processor configured to:
      calculate a relative displacement magnitude from a lateral direction of each target relative to a traveling direction of a moving object having an antenna mounted thereon using data representing the position of the targets that is measured by a reception signal of the antenna while the moving object is moving;
      calculate an average of relative moving speeds in the lateral direction of more than one of the targets relative to the traveling direction of the moving object; and
      evaluate a relative deviation between a reference axis of a scanning direction of the radar apparatus and a reference axis of the traveling direction of the moving object based on the displacement magnitude.

6. A calculation method for a radar apparatus that is configured to specify a direction of a target based on a reception signal of an antenna, the method comprising:

calculating a relative displacement magnitude from a lateral direction of the target relative to a traveling direction of a moving object having the antenna mounted thereon using data representing the position of the target that is measured by the reception signal while the moving object is moving;

calculating an average of relative moving speeds in the lateral direction of a plurality of targets relative to the traveling direction of the moving object; and evaluating a relative deviation between a reference axis of a scanning direction of the radar apparatus and a reference axis of the traveling direction of the moving object based on the displacement magnitude.

7. A computer-readable medium recording a non-transitory calculation program for a radar apparatus that is configured to specify a direction of a target based on a reception signal of an antenna, the non-transitory calculation program causing a computer to execute a method comprising:

calculating a relative displacement magnitude from a lateral direction of the target relative to a traveling direction of a moving object having the antenna mounted thereon, using data representing the position of the target that is measured by the reception signal while the moving object is moving;

calculating an average of relative moving speeds in the lateral direction of a plurality of targets relative to the traveling direction of the moving object; and evaluating a relative deviation between a reference axis of a scanning direction of the radar apparatus and a reference axis of the traveling direction of the moving object based on the displacement magnitude.

* * * * *